Jan. 14, 1941.  L. M. SHERIDAN  2,228,411
HYDRAULIC DRIVE FOR MOTOR VEHICLES
Filed Jan. 16, 1940  2 Sheets-Sheet 2
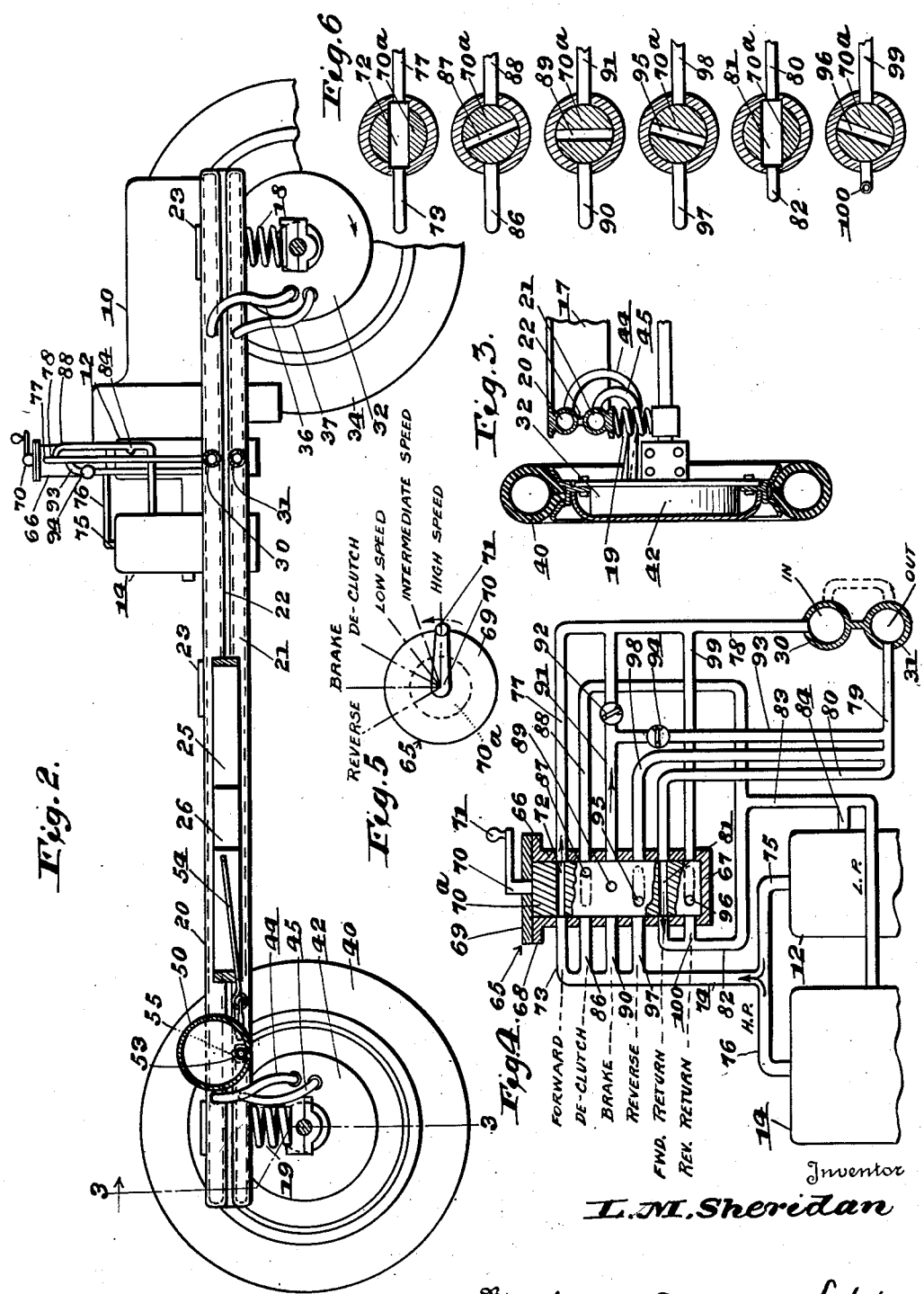

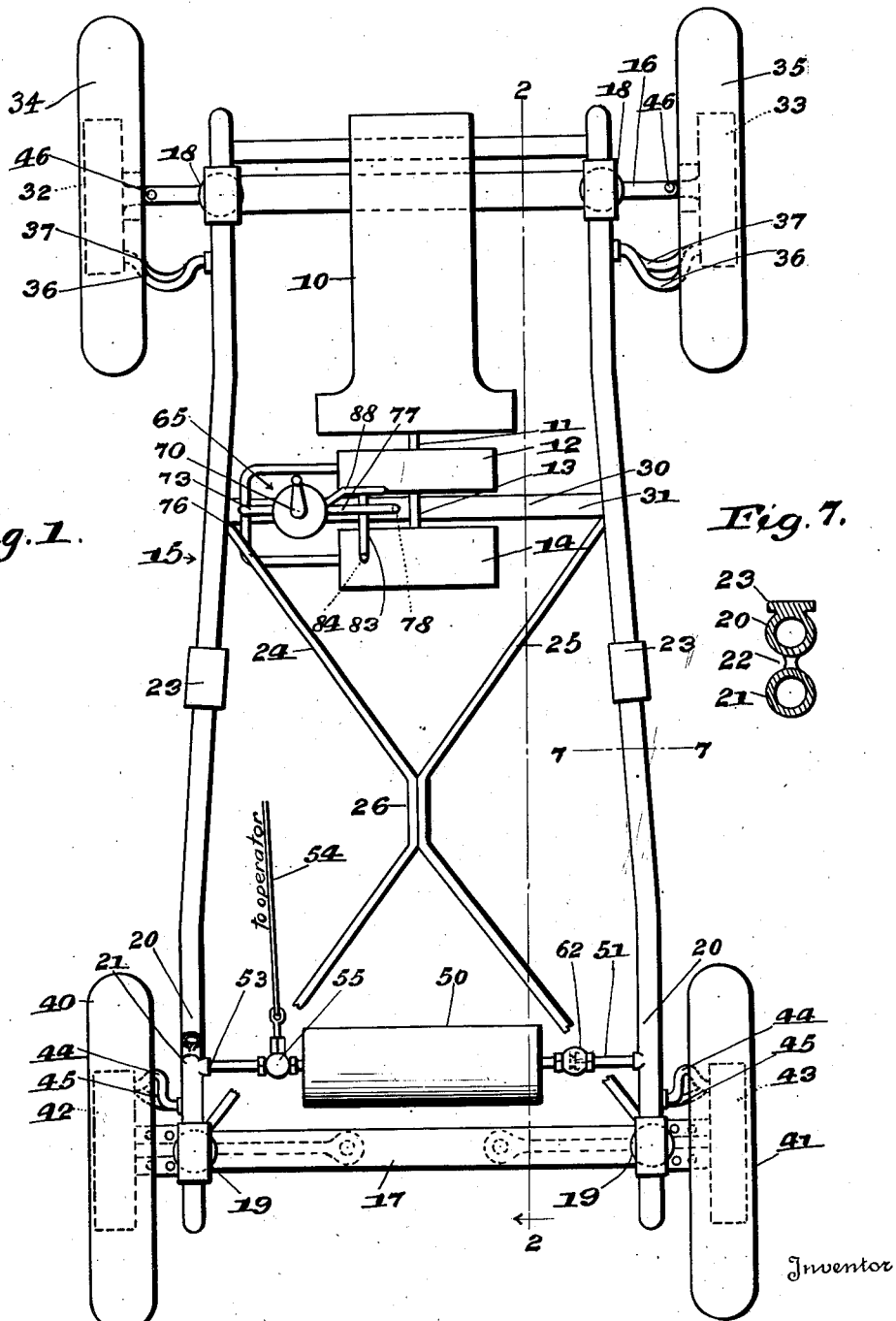

Patented Jan. 14, 1941

2,228,411

UNITED STATES PATENT OFFICE 2,228,411

HYDRAULIC DRIVE FOR MOTOR VEHICLES

Leslie M. Sheridan, Copper Cliff, Ontario, Canada

Application January 16, 1940, Serial No. 314,185

5 Claims. (Cl. 180—66)

This invention relates to an hydraulic drive for motor vehicles.

An object of the invention is the provision of a drive for motor vehicles in which the wheels are driven independently of each other by motors directly connected with the wheels and in which the various speeds of the vehicle whether forward or reverse are controlled by fluid pressure, the braking of the wheels being also controlled by the fluid pressure, thereby eliminating the usual surface brakes, differential and transmission.

Another object of the invention is the provision of a motor vehicle in which the wheels are individually driven by motors connected thereto with the motors being driven by a fluid under pressure, the fluids being conducted to and from the motors by means of pipes which form the framework of the chassis of the vehicle.

A further object of the invention is the provision of a vehicle in which the individual wheels are separately driven by motors which are operated by fluid under pressure, the pressure being created by a pump driven by a power plant, a valve being provided for controlling the flow of fluid to the motors so that varying degrees of forward speeds and reverse speeds may be had, the declutching of the power plant from the motors and the braking of the vehicle being controlled by said valve, conduits for conducting the fluid to and from the motors forming the framework of the chassis of the vehicle.

This invention will be best understood from a consideration of the following detailed description, in view of the accompanying drawings forming a part of the specification; nevertheless, it is to be understood that the invention is not confined to the disclosure, being susceptible of such changes and modifications as define no material departure from the salient features of the invention as expressed in the appended claims.

In the drawings:

Figure 1 is a plan view partly in section of a chassis of a motor vehicle with a hydraulic drive, Figure 2 is a longitudinal section taken along the line 2—2 of Fig. 1, Figure 3 is a vertical section taken along the line 3—3 of Figure 2, Figure 4 is an enlarged fragmentary vertical view partly in section showing the controlling valve, pumps and connections Figure 5 shows more or less diametrically a plan view of the control for the fluids, Figure 6 is a horizontal sectional view through the various passages of the controlling means shown in Fig. 4, and Figure 7 is a vertical section taken along the line 7—7 of Figure 1.

Referring more particularly to the drawings, 10 designates a power plant which may be either the well known form of gasoline engine employed in automobiles or it may be of the Diesel type. This engine drives a shaft 11 which operates a pump 12 and this shaft is conducted beyond the pump 12, as shown at 13, for operating a second pump 14. The engine 10 and the pumps 12 and 14 are supported by the frame of the chassis, generally designated by the numeral 15, a front axle 16 and a rear axle 17. Springs 18 and 19 of any well known type connect the frame, respectively, with the axles 16 and 17.

The frame 15 of the chassis consists of pairs of pipes 20 and 21 located in parallel relation at each side of the frame. Each pair of pipes is connected together by a longitudinal bar 22 located between the pipes while short pads 23 are secured to the uppermost pipe 21 upon which the body of the vehicle is secured. Brace rods 24 and 25 may be connected at their opposite ends to the bars 22 at each side of the frame and these rods are connected together intermediate their ends, as shown at 26 or other well known types of bracing may be used. A pipe 30 connects the pipes 20 together at each side of the vehicle while a pipe 31 connects the spaced longitudinal pipes 21 adjacent the center of the frame. These transverse pipes 30 and 31 may be located between the pumps 12 and 14 or at the end of pump 14 and acting as a support for said pumps.

The pipes 20 form the inlet conduits for the fluid for conducting fluid to the various motors 32 and 33 at the forward end of the vehicle. The flexible tube 36 connects the inlet pipes 20 with the inlet side of the motors 32 and 33 while the flexible tubing 37 connects the outlet side of said motors with the pipes 21 which form return conduits to the pumps 12 and 14.

Rear wheels 40 and 41 each have the respective motors 42 and 43. The inlet side of these motors are connected by flexible tubing 44 with the inlet pipes 20 located adjacent the resepctive wheels 40 and 41. Flexible tubes 45 connect the discharge ports of the motors 44 and 43 to the adjacent return pipe 21 at each side of the frame 15.

The motors 32, 33, 42 and 43 may be of the gear operated type or they may be of any well known form suitable for the purpose. These motors, from an inspection of the drawing, will show that they have been merely diagrammatically indicated.

The pumps 12 and 14 may be of the gear type or they may be of the reciprocating piston type or other well known forms of rotary pumps.

The wheels 34 and 35 are supported by the usual king pins 46 for steering purposes and the connections for controlling the positions of these wheels are not disclosed since they may be of the standard type employed.

An air tank 50 is supported in any approved manner at the rear of the vehicle and on the frame 15. A pipe 51 is adapted to place the tank at the bottom thereof in communication with the pipe 20 and a check valve 52 permits the liquid under pressure from the pipe 20 to pass into the bottom of the tank and compress whatever air is in the tank. The valve, however, prevents the liquid from returning from the tank 50 to the pipe 20 at the right hand side of the vehicle as shown in Fig. 1. A pipe 53 connects the bottom of the tank 50 with the return conduit 21 at the left hand side of the vehicle. A valve 55 incorporated in the pipe 53 is adapted to be operated by a rod 54 which extends to a point adjacent the operator of the vehicle. This valve is normally closed to prevent the discharge of fluid from the tank 50 so that the air above the liquid in the tank will be compressed by the pressure of the liquid and this tank has a reserve for supplying liquid under pressure to the pumps causing rotation of the pumps and initiating starting of the engine 10.

When it is desired to start the engine 10 the valve 55 is opened manually and the liquid under pressure is conducted through a pipe 21 to the pumps which in this instance act as a self-starter for the engine.

However, it will be appreciated that when the liquid from the return pipe 21 is used to start the operation of the pumps, the valve 70a must be in a position so that the liquid may be returned through the transverse pipe 31 and to one of the return conduits which communicates with the valve 70a. For this purpose the valve 70a is rotated to the position shown in Fig. 4 for indicating forward movement so that the pipe 80 will conduct the liquid through the passage 81 in the valve to the pipe 82 and thence to the pipes 83 and 84 to the pumps 12 and 14. Since the fluid is under pressure it will cause rotation of the pumps and likewise the engine 10 because said engine is coupled with the pumps.

A controlling device, generally indicated by the numeral 65 and more particularly shown in Figs. 4, 5 and 6, is adapted to determine the flow of the fluid, which is preferably oil, to and from the individual motors connected to the wheels of the vehicle and includes the valve 70a above referred to.

This device consists of a cylinder 66 having a closed bottom 67 and a flanged open top 68. Closure plate 69 is secured in any approved manner to the top 68. A shaft 70 projects through an opening in the closure 69 and is provided with an operating handle 71. A diametrically disposed passage 72 in a valve 70a, Figs. 4 and 6, is connected by means of a branch pipe 73 with a pipe 74 and this pipe in turn is connected with pipes 75 and 76 leading, respectively, to the outlet side of the pumps 12 and 14. A pipe 77 is connected with the cylinder 66 and is adapted to communicate with the passage 72. The pipe 77 is in communication with the main inlet pipe 78 which communicates with the transverse pipe 30.

A pipe 79 is in communication with the transverse return pipe 31 and a branch pipe 80 connects the pipe 79 with one end of a diametrical passage 81 formed in the valve 70a. The passage 81 is in substantially the same plane with the passage 72 so that when the ends of the last-mentioned passage are in alignment with the pipes 73 and 77 the passage 81 will be in alignment or in communication with the branch pipe 80 and a return pipe 82 which extends from the cylinder 66 to a pipe 83. The last-mentioned pipe conducts exhaust fluid back to the pump 14. A branch pipe 84 connected with a pipe 83 also conducts fluid to the inlet or suction end of the pump 12.

Thus it will be seen that when the pumps 12 and 14 are operating fluid is forced through the pipe 74 through the passage 72, the pipes 77 and 78 to the transverse pipe 30 whence the oil or other liquid will be forced under pressure through the pipe 20 to the motors of the vehicle. The flexible tubing 37 and 45 conducts the exhaust fluid from the motors to the pipes 21 and thence through the transverse pipe 31 to the pipe 79, thence through pipe 80, passage 81, and thence through the pipes 82, 83 and 84 to the low pressure side of pumps 12 and 14.

When it is desired to declutch the wheels from the power plant, the fluid is short circuited by means of the valve 70a through the pipes 74 and 86, passage 87 in the valve 70a (Fig. 6), pipes 88, 83 and 84. In other words, the handle 71 is operated to the position on the cover 69 where the declutch is indicated and therefore the passages 72 and 81 are out of registration with the respective outlet and inlet port while the passage 87 in the said valve is in registration with the pipes 86 and 88.

When the handle 71 is moved to the position indicated by the word "Brake" (Fig. 5), the passage 89 in the valve 70a will be placed in communication with a branch pipe 90 connected with the pipe 74 and a pipe 91 which communicates with the passage 89 and pipe 78. A check valve 92 incorporated in the pipe 91 will permit the flow of fluid through the pipe 91 to the pipe 78 but will prevent the flow of fluid from the pipe 78 towards the passage 89. A pipe 93 connects the pipe 91 with the return pipe 79. A check valve 94 incorporated in the pipe 93 will permit fluid passing from the pipe 91 through the pipe 93 but will prevent backward flow of the fluid. In other words, when the passage 89 is aligned with the pipes 90 and 91 all of the other passages in the pipe are closed by angular movement of the valve 70a so that fluid under pressure from the pumps 12 and 14 will enter both of the pipes 78 and 93 and likewise the transverse pipes 30 and 31 and the pipes 20 and 21. In view of this condition pressure will be exerted on both sides of the motors connected with the wheels of the vehicle and therefore the motors will be held stationary as will be the wheels.

When it is desired to reverse the vehicle the handle 71 is moved to the position indicated by "Reverse" in Fig. 5. When this happens the valve 78 has all of its ports closed except a passage 95 and a passage 96 in the valve 70a.

When the valve is moved to the position just described a branch pipe 97 which connects the pipe 74 with the passage 95 will conduct fluid through the passage to a pipe 98 and the fluid under pressure then will be forced through the lower transverse pipe 31 and the lower longitudinal pipes 21 so that the motors will be acted upon in a reverse manner to cause retrograde motion of the vehicle. At this time the former inlet pipes 20 and 30 will act as outlet pipes and the return fluid will pass through the inlet pipe 78 and a branch pipe 99, thence through the passage 96 in the valve 70a after which the liquid will be conducted through the branch pipe 100 to the return pipe 82 and thence back through the pipes 83 and 84 to the low pressure side of the pumps 12 and 14. The passages 95 and 96, as shown in Fig. 6, in the valve 70a are in vertical alignment so that these passages will be open respectively to the pipes 97, 98, 99 and 100. All of the other passages, however, will be closed so that no liquid can be forced through the various branch pipes in opposition to the flow of fluid through the pipes 31 and 21 or in opposition to the flow of fluid in the pipes 20 and 30.

While the handle 71 and the dial shown in Fig. 5 are illustrated as being located adjacent the valve 70a and the cylinder 66, nevertheless, when necessary these elements may be positioned close to the driver's seat for the convenience of observation and operation.

The operation of my device is as follows: The handle 71 is moved either from brake or declutched position (Fig. 5) to the low speed position and thence to the intermediate and high speed for driving the automobile normally along the highway. When it is desired to stop the machine the handle is then moved from the high speed or an intermediate speed to the brake position when the vehicle will be stopped. If it is desired to reverse the movement of the vehicle the handle is then moved to reverse when the fluid will be pumped under pressure to the motors in an opposite direction to thereby reversely rotate the motors and likewise the wheels. By this construction it will be seen that the ordinary service brake, the clutch pedal, the transmission and differential are eliminated and the vehicle is solely controlled by the operation of the lever 70 and likewise the valve 70a. The vehicle, however, will be equipped with the usual emergency brake. In view of the fact that the air in the cylinder 50 is maintained under pressure at all times, the operation of a valve will permit fluid to go to pumps 12 and 14 which act as a starting motor for initiating operation of the engine 10.

When the operating handle 71 is moved to the low speed position shown in Fig. 5, the valve 70a is moved to a position so that the wide passage 72 will begin to place the pipe 73 in communication with the pipe 77. At this time the engine 10 is operating slowly as are the pumps 12 and 14 so that the pressure on the fluid is relatively low. Furthermore, since the passage 72 (Fig. 6) is just barely open to the pipes 73 and 77 there is considerable friction on the fluid so that the pressure on the motors in the wheels will be just sufficient to drive the automobile at low speed.

When the handle 71 is moved to the intermediate speed, the passage 72 is further opened to the pipes 73 and 77. Therefore, a greater volume of liquid will be forced through the pipe 77 and thence to the motors in the wheels. An increase in the engine speed at this time will increase the pressure on the fluid in the system so that the motors in the wheels will be driven faster and the automobile will travel at a greater speed. However, when the handle 71 is moved to the high speed position and the speed of the engine and likewise the pumps 12 and 14 has been increased sufficiently the motors in the wheels will be driven at the maximum speed as will be the automobile.

The passages 72 and 61 in the valves 70a (Fig. 6) are of sufficient width that the angular movement of said valve when moved from low speed to high speed will be sufficient to maintain the pipes 73 and 77 in communication with said passages during the forward speeds of the vehicle.

It must be borne in mind that the speed of the vehicle is largely dependent upon the R. P. M.'s of the engine 10 and likewise the pumps 12 and 14.

I claim:

1. In an automobile, a frame forming part of the chassis of the automobile, said frame having pairs of longitudinal pipes forming the side members of said frame, a motor operatively connected to each wheel, one of the pipes at each side of the frame forming an inlet conduit for the motors, the other pipe forming a return conduit, transverse pipes connecting the longitudinal pipes in pairs, means connecting the longitudinal pipes with the motors, a pump for forcing liquid through the pipes to the motors, and means interposed between the pump and transverse pipes for controlling the flow of liquid through the inlet and return conduits.

2. In an automobile, a frame forming part of the chassis of the automobile, said frame having pairs of longitudinal pipes forming the side members of said frame, a motor operatively connected to each wheel, one of the pipes at each side of the frame forming an inlet conduit for the motors, the other pipe forming a return conduit, transverse pipes connecting the longitudinal pipes in pairs, means connecting the longitudinal pipes with the motors, a pump for forcing liquid through the pipes to the motors, a cylinder interposed between the pump and the transverse pipes, a plurality of conduits connecting the cylinder at diametrically opposite points with the pump and transverse pipes, a valve in the cylinder provided with a plurality of diametrically disposed passages adapted to be alternately aligned with certain of the last-mentioned conduits for controlling the flow of liquid through the transverse and longitudinal pipes for operating the motors.

3. In an automobile, a frame forming part of the chassis of the automobile, said frame having pairs of longitudinal pipes forming the side members of said frame, a motor operatively connected to each wheel, one of the pipes at each side of the frame forming an inlet conduit for the motors, the other pipe forming a return conduit, transverse pipes connecting the longitudinal pipes in pairs, means connecting the longitudinal pipes with the motors, a pump for forcing liquid through the pipes to the motors, a cylinder, a plurality of conduits communicating with the cylinder at diametrically opposite points and connecting said cylinder with the transverse pipes and pump, a rotatable valve in the cylinder provided with a plurality of diametrically disposed passages, adapted to connect alternately a pair of the diametrically disposed conduits for controlling the flow of liquid to the motors and determining varying speeds of the motors.

4. In an automobile, a frame forming part of the chassis of the automobile, said frame having pairs of longitudinal pipes forming the side members of said frame, a motor operatively connected to each wheel, one of the pipes at each side of the frame forming an inlet conduit for the motors, the other pipe forming a return conduit, transverse pipes connecting the longitudinal pipes in pairs, means connecting the longitudinal pipes with the motors, a pump for forcing liquid through the pipes to the motors, means connecting the pump with the transverse pipes and including a valve for controlling the flow of liquid from the pressure side of the pump through the inlet conduits to the motor for causing varying degrees of forward speeds of the automobile, and means in the valve for causing reversal of the liquid flow in the inlet and return pipes for causing the motors to drive the automobile rearwardly.

5. In an automobile, a frame having longitudinal side members formed of pairs of spaced pipes, an hydraulic motor operatively connected with each wheel of the automobile, conduits connecting one of the pipes at each side of the frame with the inlet side of the motors, other conduits connecting the outlet side of the motors with the other pipes which form return conduits, a pump for forcing liquid under pressure through the first-mentioned pipes to the motors, and means connecting the pump with the pairs of pipes and including means for controlling the flow of liquid under pressure between the motors and the pump.

LESLIE M. SHERIDAN.